(12) United States Patent
Yao et al.

(10) Patent No.: US 9,059,839 B2
(45) Date of Patent: Jun. 16, 2015

(54) COMMUNICATION TERMINAL USING A TEMPORARY NETWORK KEY FOR ASSEMBLING A SECURE COMMUNICATION FRAME

(75) Inventors: Taketsugu Yao, Osaka (JP); Jun Nakashima, Osaka (JP); Kiyoshi Fukui, Mie (JP)

(73) Assignee: Oki Electric Industry Co., Ltd., Tokyo (JP)

(*) Notice: Subject to any disclaimer, the term of this patent is extended or adjusted under 35 U.S.C. 154(b) by 355 days.

(21) Appl. No.: 12/929,530

(22) Filed: Jan. 31, 2011

(65) Prior Publication Data

US 2011/0188654 A1 Aug. 4, 2011

(30) Foreign Application Priority Data

Feb. 1, 2010 (JP) ................................. 2010-020401

(51) Int. Cl.
*H04L 29/06* (2006.01)
*H04L 9/08* (2006.01)

(52) U.S. Cl.
CPC ................. *H04L 9/08* (2013.01); *H04L 9/0838* (2013.01); *H04L 63/068* (2013.01)

(58) Field of Classification Search
USPC .................................. 380/270, 273, 284, 286
See application file for complete search history.

(56) References Cited

U.S. PATENT DOCUMENTS

| 2002/0141591 | A1 | 10/2002 | Hawkes et al. | |
|---|---|---|---|---|
| 2003/0061518 | A1* | 3/2003 | Yamaguchi et al. | 713/201 |
| 2008/0009274 | A1* | 1/2008 | Zhu et al. | 455/414.2 |
| 2008/0016350 | A1* | 1/2008 | Braskich et al. | 713/169 |
| 2008/0195740 | A1* | 8/2008 | Lowell et al. | 709/229 |
| 2009/0019284 | A1* | 1/2009 | Cho et al. | 713/170 |
| 2010/0014674 | A1* | 1/2010 | Lin | 380/273 |
| 2010/0091993 | A1* | 4/2010 | Iwama | 380/273 |
| 2011/0096927 | A1* | 4/2011 | Baek et al. | 380/270 |

FOREIGN PATENT DOCUMENTS

| CN | 1777324 | A | 5/2006 |
|---|---|---|---|
| CN | 101483865 | A | 7/2009 |
| CN | 101631275 | A | 1/2010 |
| JP | 09-312642 | | 12/1997 |
| JP | 2002290396 | A | 10/2002 |
| JP | 2006019975 | A | 1/2006 |
| JP | 2008-135816 | A | 6/2008 |
| WO | WO-2008096396 | A1 | 8/2008 |

OTHER PUBLICATIONS

Japanese Office Action dated on Sep. 9, 2014.

\* cited by examiner

*Primary Examiner* — Joseph P Hirl
*Assistant Examiner* — Chi Nguy
(74) *Attorney, Agent, or Firm* — Rabin & Berdo, P.C.

(57) ABSTRACT

A communication terminal generates a temporary network key based on a managed master network key and on key identification used for security processing on a communication frame. The security processing is performed on the communication frame using the temporary network key. A secure communication frame is produced in which the identification of the key is indicated.

9 Claims, 6 Drawing Sheets

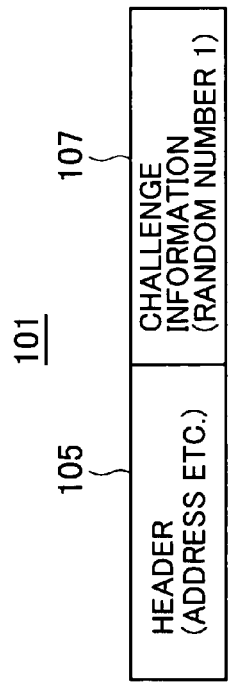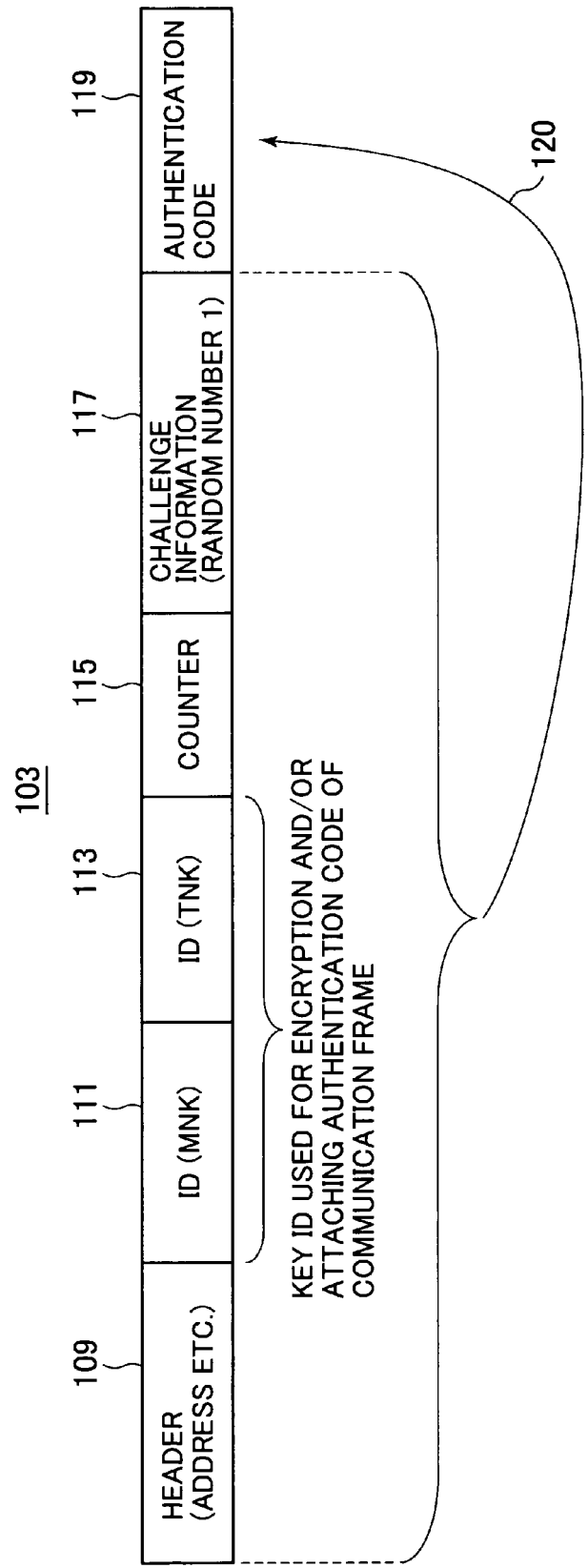

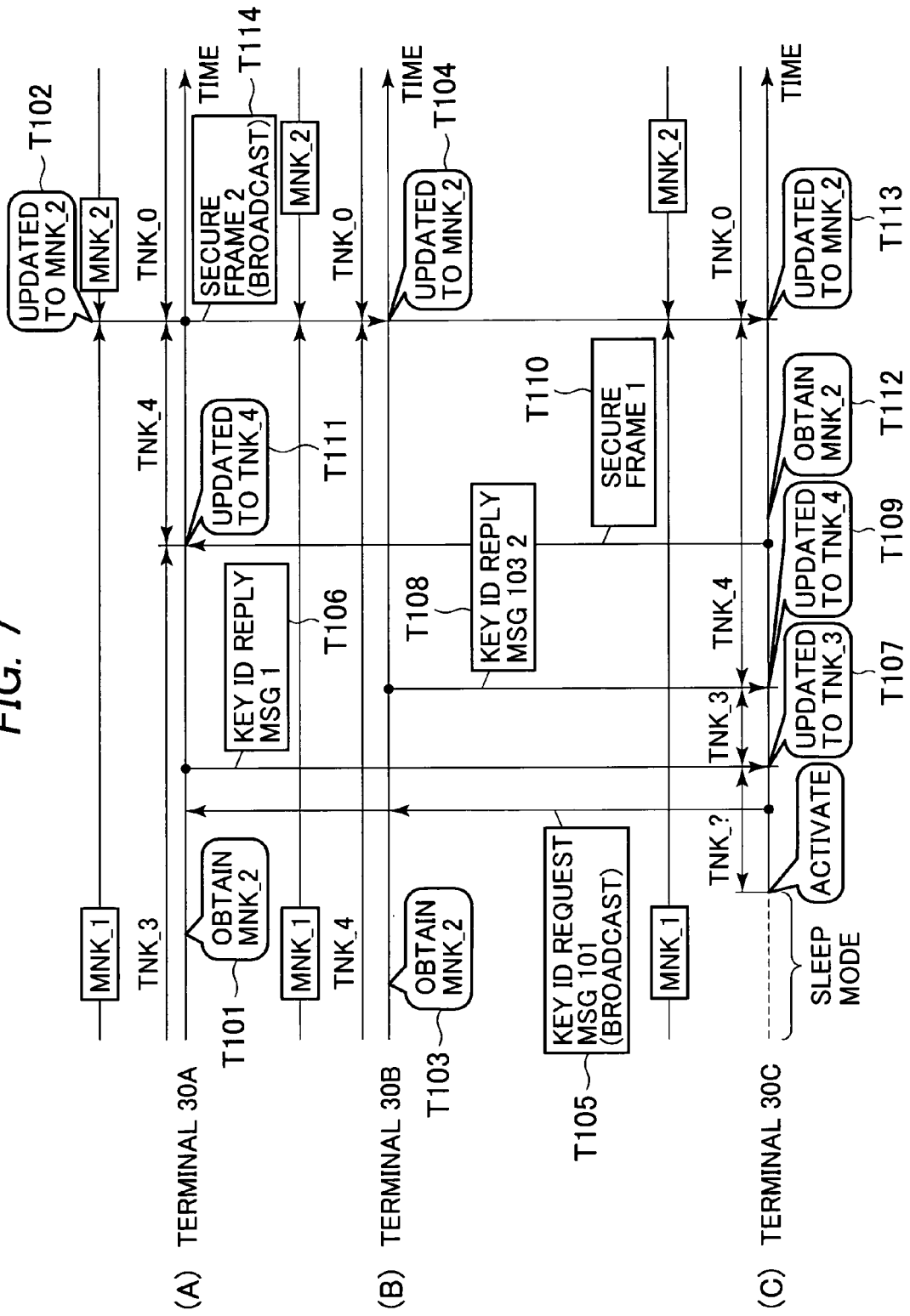

COMMUNICATION TERMINAL USING A TEMPORARY NETWORK KEY FOR ASSEMBLING A SECURE COMMUNICATION FRAME

BACKGROUND OF THE INVENTION

1. Field of the Invention

The present invention relates to a communication terminal, and more particularly to a communication terminal which uses a key shared across a telecommunications network for encryption and authentication ensuring security of communications. The present invention also relates to a telecommunications system including such a communication terminal.

2. Description of the Background Art

Mesh networks are a kind of telecommunications network including two or more communication terminals which are interconnected in the form of mesh to communicate with each other. On a mesh network, each communication terminal may communicate with other communication terminals, such as adjacent terminals, existing within a range with which the terminal can communicate by its own communication capability. That communication terminal, which may simply be referred to as subject terminal, may communicate with still other communication terminals, such as nonadjacent terminals, existing beyond that range on a multi-hop communication, in which information transmitted from the subject terminal is transferred via an communication terminal adjacent thereto toward a nonadjacent terminal. That means that each communication terminal on a mesh network suffices to emit radio waves having its power to be able to communicate with its adjacent terminals. Furthermore, in a mesh network, if a communication terminal is damaged or disconnected from the network, it is easy to secure an alternative path. Therefore, the mesh network is advantageous particularly in that it is more fault-tolerant than a non-mesh network, such as a conventional star network, which may be rendered incommunicable if a communication terminal serving as a hub suffers from a fault.

A system will now be discussed in which keys are shared across the whole network to encrypt and authenticate communications. In a telecommunications system where security is ensured by providing a shared network key within a network, communication terminals connected to the network have a shared network key. That provides an advantage that the communication terminals connected to the network can perform communications with security maintained without identifying in advance a communication terminal to communicate.

However, under the circumstances where a large number of nodes encrypt and authenticate communication data, it may be undesirable from the viewpoint of security assurance to continuously use the same network key without updating. For example, there is a possibility that an attacker can identify the network key without requiring much time in analyzing such numerous ciphertext messages flowing over the network.

Especially, where quite a lot of nodes are connected to a network, the more frequently the network key is used, the more attacks intend to analyze the network key. For this reason, it is desirable that the network key be periodically updated.

U.S. patent application publication No. 2002/0141591 A1 to Hawkes et al., teaches secure transmissions implemented by each telecommunications node connected to a network having a first broadcast key used for a long time and a second broadcast key used for a short time. The second broadcast key used for a short time is encrypted using the first broadcast key used for a long time, and provided to each node at regular intervals. Broadcast messages sent by a node to all other nodes connected to the network are encrypted using the second broadcast key utilized briefly, and decrypted also using the second broadcast key.

However, where Hawkes et al., is applied to a large-scale network having a large number of telecommunications nodes, the following problems may be raised.

The first problem may be raised when a network key used for encryption and authentication of communications is frequently updated. For example, whenever the network key is updated, a notice of the update is given to all the communication terminals and, therefore, such broadcast traffic frequently occurs in a large-scale network. This places heavy load on communications performed over the whole network.

The second problem is that when the scale of the network is large, it may take a long time for the updated network key to arrive at all the terminals. For example, when some terminals are asleep in power saving mode or a communication path fails, the updated network key does not always arrive instantly at all the communication terminals. In this case, it is impossible to synchronize the communication terminals with each other on the entire network with respect to the network key.

SUMMARY OF THE INVENTION

It is therefore an object of the present invention to provide a communication terminal and a telecommunications system capable of solving the conventional problems, even in a large-scale network, of an increased load associated with communications and failure to instantaneously synchronize communication terminals with each other with respect to a network key.

In a communication terminal according to the present invention, from a master network key to be used for a long time, a temporary network key is produced, on which an identification is inserted into a communication frame. Thus, the communication terminal according to the present invention is capable of solving the conventional problems, even in a large-scale network, of an increased load associated with communications and failure to instantaneously synchronize communication terminals with each other with respect to a network key.

The inventive concept disclosed in the application may also be defined in ways other than in the claims presented below. The inventive concept may consist of several separate inventions particularly if the invention is considered in light of explicit or implicit subtasks or from the point of view of advantages achieved. In such a case, some of the attributes included in the claims may be superfluous from the point of view of separate inventive concepts. Within the framework of the basic inventive concept, features of different embodiments are applicable in connection with other embodiments.

BRIEF DESCRIPTION OF THE DRAWINGS

The objects and features of the present invention will become more apparent from consideration of the following detailed description taken in conjunction with the accompanying drawings in which:

FIGS. 6A and 6B schematically show an example of format of a key identification request message 101 and an example of format of a reply message 103 responsive to the request message 101, respectively; and FIG. 7 is a time chart, like FIG. 4, useful for understanding communication processing in a telecommunications system using keys shared across a network according to the alternative embodiment.

DESCRIPTION OF THE PREFERRED EMBODIMENTS

A preferred embodiment of the telecommunications system according to the present invention will be described with reference to FIGS. 1 and 2. The illustrative embodiment is directed, as an example, to a large-scale mesh type of telecommunications network formed by a plurality of network nodes each including a communication device to which the present invention is applied in the form of communication terminal.

Figure 1:
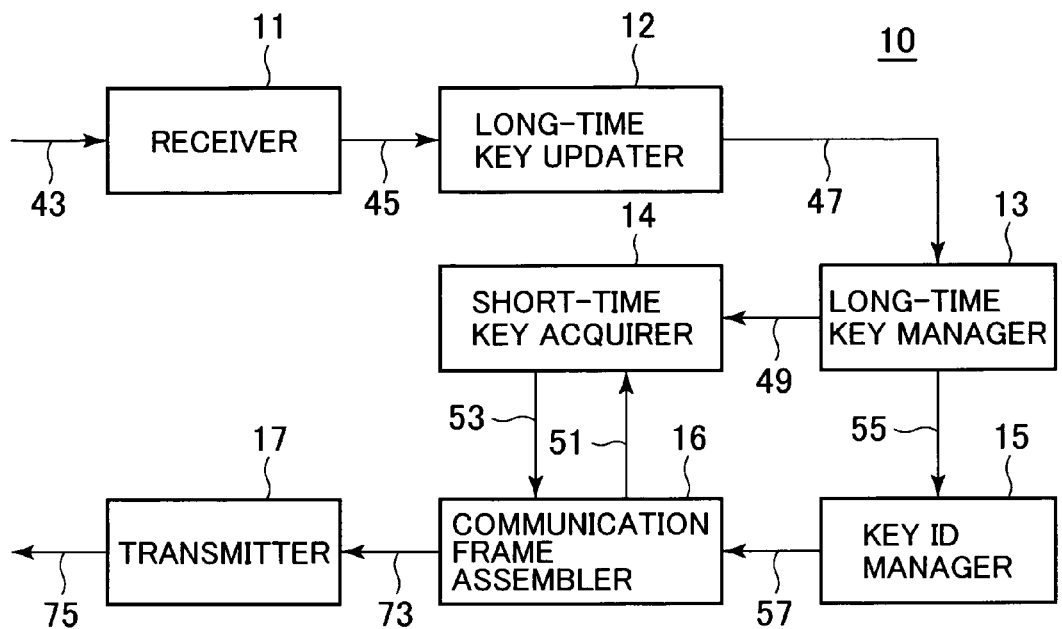
FIG. 1 is a schematic block diagram showing the internal configuration of a transmitter communication terminal according to an illustrative embodiment of the present invention.

With reference first to FIG. 1, the internal configuration of a transmitter communication terminal 10, serving on a transmitter side, will be described. Generally, the transmitter communication terminal 10 includes at least a receiver 11, a long-time key updater 12, a long-time key manager 13, a short-time key acquirer 14, a key identification (ID) manager 15, a communication frame assembler 16 and a transmitter 17, which are interconnected as illustrated. Components or sections not relevant to understanding the invention will neither be shown nor described just for simplicity.

The illustrative embodiment of the transmitter communication terminal 10 is depicted and described as configured by separate functional blocks, such as long-time key updater 12. It is however to be noted that such a depiction and a description do not restrict the terminal 10 to an implementation only in the form of hardware but may partially or entirely be implemented by software, namely, by a computer, or processor system, which has a computer program installed and functions, when executing the computer program, as part of, or the entirety of, the transmitter 10. That may also be the case with illustrative embodiments which will be described below. In this connection, the word "circuit" or "section" may be understood not only as hardware, such as an electronics circuit, but also as a function that may be implemented by software installed and executed on a computer.

Figure 3:
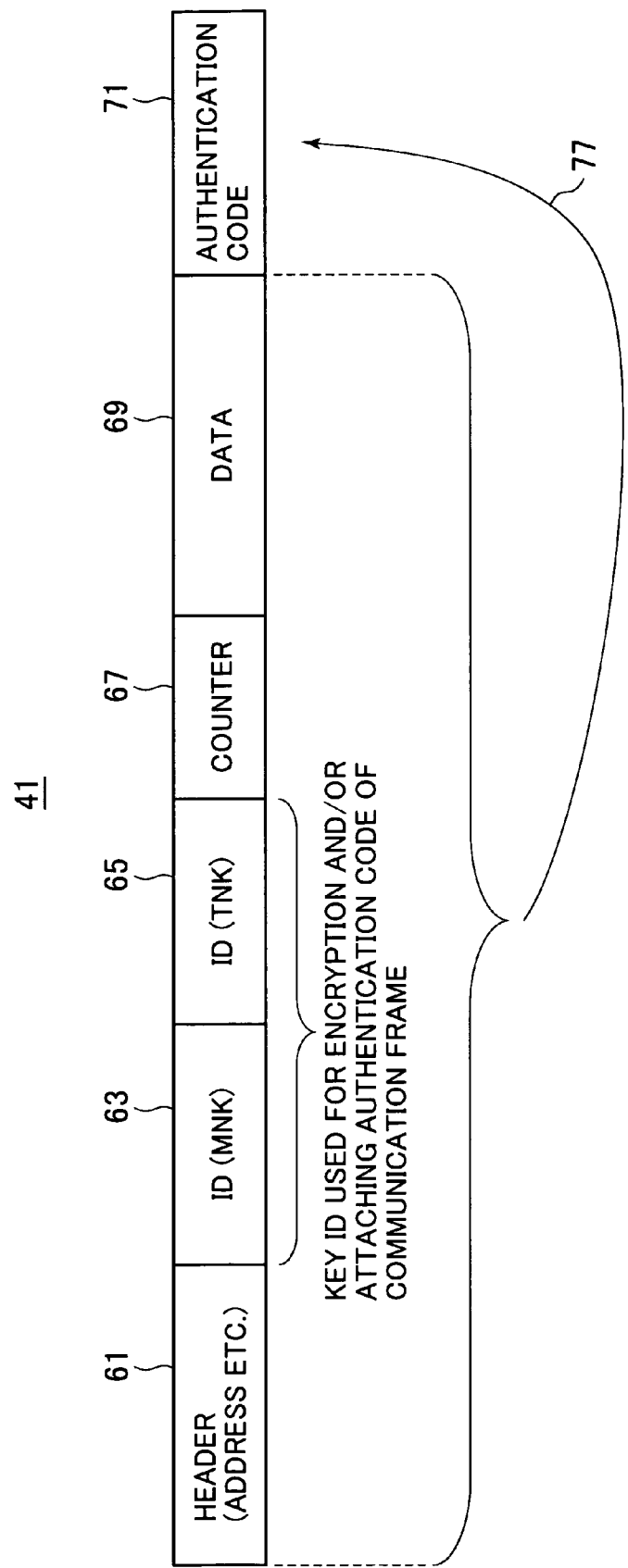
FIG. 3 schematically shows an example of format of a secure communication frame according to the embodiment.

The receiver 11 is adapted to receive a secure communication frame 41, FIG. 3, transmitted over the mesh type of telecommunications network, which is not specifically shown but merely symbolically shown with a reference numeral 43 directed to a reception line. The receiver 11 is also adapted to detect in the secure communication frame 41 a notice message about a master network key that is shared across the network to be used for a long term, and transfer the secure communication frame 41, when inserted in the frame 41, to the long-time key updater 12 on a connection 45. Signals may be designated with reference numerals of connections on which they are conveyed. The system may be adapted to transmit secure communication frames 41 having a master network key inserted therein by, for example, a network manager device to all the communication terminals thereon.

The long-time key updater 12 is adapted to obtain the secure communication frame 41 having a master network key notice message inserted therein from the receiver 11, and manage the update of the master network key. For example, the key updater 12 may be adapted to decrypt and authenticate the secure communication frame 41, given from the receiver 11 and having the master network key notice message inserted therein, to thereby acquire the newest master network key.

The long-time key updater 12 may be adapted to thus be given the master network key from the receiver 11. Alternatively, the long-time key updater 12 may be adapted to receive, together with the master network key, information including all or some of information on the identification of that key or on the start of use. Furthermore, the updater 12 may be adapted to receive, instead of the master network key itself, information for generating a master network key, or may be adapted to generate a new master network key closely by itself.

The long-time key updater 12 transfers the acquired master network key to the long-time key manager 13 on a connection 47. Where the key updater 12 is adapted to be given the identification of the key together with the acquired master network key, the updater 12 may transfer the key identification also to the long-time key manager 13.

In the illustrative embodiment, the long-time key updater 12 may be adapted to start using a master network key in the following method (1), (2) or (3), although not restrictive:

(1) If, together with a master network key obtained, information on the start of use of that master network key is given, the master key may be switched at timing specified by the information;

(2) Separately from a message notifying a master network key, a message indicating the start of using the master network key may be received to thereby switch the new master network key to use; or (3) When a counter that manages the identification of a temporary network key has just or almost expired, the master network key may be switched.

The long-time key manager 13 is adapted to manage the master network key received from the long-time key updater 12, and transfer the master network key managed by itself to the short-time key acquirer 14 over an interconnection 49.

The long-time key manager 13 may also be adapted to receive only the master network key or both the master network key and the identification of the key from the long-time key updater 12. With the illustrative embodiment, the key manager 13 may exemplarily be adapted to receive both the master network key and its identification.

Where the long-time key manager 13 is adapted to receive a master network key and its identification, the key manager may preferably be adapted to receive the identification of the key to manage the identification of the master network key. Because, when the master network key has been used over a predetermined long period of time and the usage term expires, the key is updated, i.e. replaced by new one, and therefore it is necessary to identify which master network key is currently used among the master network keys existing.

When the short-time key acquirer 14 receives the identification 51 of a temporary network key from the communication frame assembler 16 adapted for asking for acquisition of a key, the key acquirer 14 receives a master network key 49 from the long-time key manager 13. Then, the short-time key acquirer 14 makes use of the master network key 49 and the identification 51 of the temporary network key to generate a temporary, or short-time, network key.

The short-time key acquirer 14 may be adapted to receive the currently used master network key from the long-time key manager 13. Alternatively, the short-time key acquirer 14 may be adapted to receive plural master network keys from the long-time key manager 13 and the identifications of those master network keys together with the identification of the temporary network key from the communication frame assembler 16 to use the identifications of the master network keys to thereby select a master network key to newly be used among those plural network keys. It is to be noted in the illustrative embodiment that algorithm for generating a temporary network key may not be restricted but selected from a wide variety of algorithms.

The short-time key acquirer 14 sends the temporary network key thus generated to the communication frame assembler 16. The short-time key acquirer 14 may be adapted to store in memory the generated temporary network key together with the identification of the key. That is advantageous in a case, for example, where the key acquirer 14 is given the identification of the same key as used in the past from the communication frame assembler 16, the acquirer 14 may respond without newly generating the same temporary network key. The short-time key acquirer 14 may also be adapted to manage information on, e.g. a count value, instants of time and the address of the terminal 10, which is to be used to prevent a replay attack that a malicious attacker against a communication frame gets an identification inserted in plaintext described previously and impersonates the authentic user, and to deliver that information to the communication frame assembler 16 together with the temporary network key.

The key ID manager 15 serves as managing the identifications of keys. The identifications of keys may be used to identify network keys that make communication frames 41 secure.

The identification of key includes at least identification information identifying a temporary network key. The identification of key may additionally include identification information identifying a master network key used to generate the temporary network key. For example, the identification for key may be a bit string assigned to a network key or a count value indicating a serial number to be incremented or decremented. The key ID manager 15 is given the identification of a newly obtained master network key from the long-time key manager 13 over a connection 55, and manages the identification.

The key ID manager 15 may be adapted to update, at an arbitrary timing, the identification of a temporary network key managed by itself. If the key ID manager 15 is adapted to manage, for example, a count value indicating a serial number as the key identification, the manager 15 can increment or decrement the serial number in response to a predetermined period of time elapsing to thereby update the identification. The initial value of the count value may be set to the identification of a temporary network key generated by using a master network key of which the identification is newly provided by the long-time key manager 13.

The key ID manager 15 may further be adapted to be responsive to the identification of a temporary network key being updated a predetermined number of times to start to use the identification of a master network key newly obtained from the long-time key manager 13. For example, the identification of a master network key may be updated when the count value indicating the serial number of a temporary network key has approached its expiration, or full count. The key ID manager 15 transfers the identification of a key managed by itself to the communication frame assembler 16 over a connection 57.

The communication frame assembler 16 is adapted to perform a security operation on a communication frame to produce a secure communication frame 41, FIG. 3. In this context, the security processing may refer to encryption or incorporation of an authentication code 71, for example. However, the security operation is not limitative to those examples. It is to be noted in the illustrative embodiment that algorithm for encryption and incorporation of authentication codes 71 may not be restricted but selected from a wide variety of algorithms.

The communication frame assembler 16 transfers the key identification 57 supplied from the key ID manager 15 to the short-time key acquirer 14 on the interconnection 51. The communication frame assembler 16 receives the temporary network key 53 from the short-time key acquirer 14, and makes use of the temporary network key to produce a secured communication frame 41.

With reference to FIG. 3, an example of the format of a secure communication frame 41 will be described. As shown in the figure, the secure communication frame 41 includes the fields of at least a header 61 containing address information, the identification of a master network key (MNK) 63, the identification of a temporary network key (TNK) 65, information on a counter 67, data 69 and an authentication code 71, which may be arranged as depicted.

The secure communication frame 41 includes information for identifying a temporary network key used by the security operation on the communication frame 41. For example, the format shown in FIG. 3 is particularly featured in that some field, such as header field 61, of the secure communication frame 41 has key identification information incorporated therein in plaintext, such as the identifications of a master network key (MNK) and a temporary network key (TNK), given from the key ID manager 15.

In order to prevent replay attacks, the communication frame assembler 16 may be adapted to utilize a count value, time information indicating an instant of time, information on its own address, i.e. the address of the terminal 10, or other information for the security processing. For example, the assembler 16 may be adapted to manage its counter, not shown, together with a temporary network key, and use the temporary network key managed by itself and the counter to produce a secure communication frame 41. The counter may be updated, i.e. incremented or decremented, whenever a secure communication frame 41 is produced. The security processing may be performed employing the information on its own address. Information for use in the security processing, such as a count value, time information, and information on its own address, may be given together with a temporary network key from the short-time key acquirer 14. The communication frame assembler 16 provides a secure communication frame 41 to the transmitter 17 on a connection 73, FIG. 1.

The transmitter 17 is adapted to transmit the secure communication frame 41 provided by the communication frame assembler 16 over the mesh network to other communication terminals. The mesh network is not specifically shown as such but merely symbolically shown with a reference numeral 75 directed to a transmission line.

Figure 2:
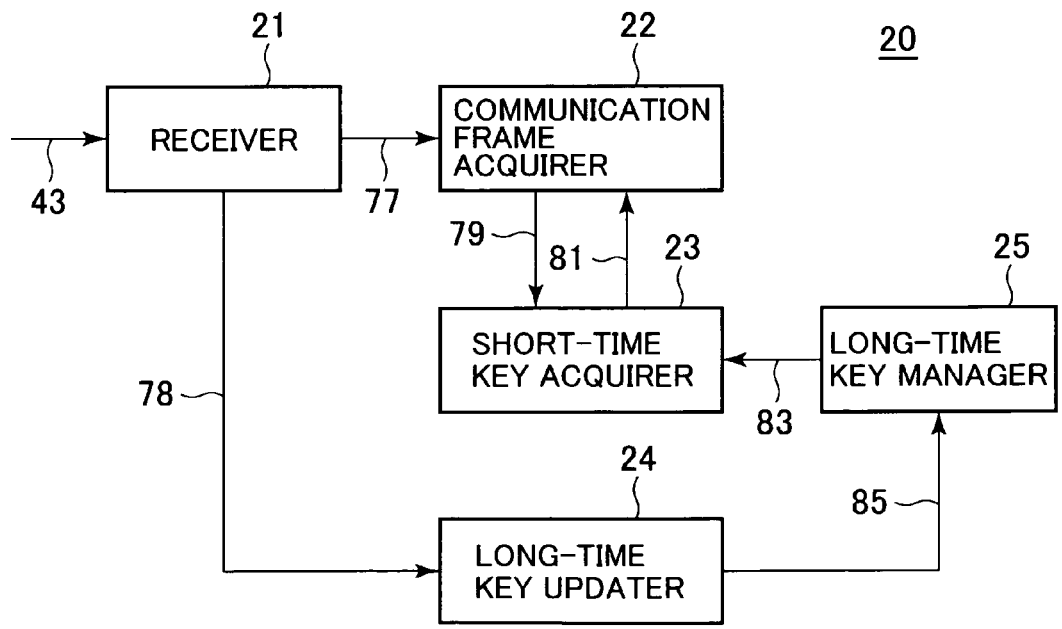
FIG. 2 is a schematic block diagram showing the internal configuration of a receiver communication terminal according to the illustrative embodiment.

Now, FIG. 2 shows the internal configuration of a receiver communication terminal 20, serving on a receiver side, according to the illustrative embodiment of the present invention. As shown in the figure, the receiver communication terminal 20 of the illustrative embodiment generally includes at least a receiver 21, a communication frame acquirer 22, a short-time key acquirer 23, a long-time key updater 24 and a long-time key manager 25, which are interconnected as depicted. Like components or sections are designated with the same reference numerals, and will not repetitively be described for avoiding redundancy.

The receiver 21 may fundamentally be similar to the receiver 11 shown in FIG. 1 except that secure communication frames 41 received from other communication terminals are transferred to the communication frame acquirer 22 over a connection 77 and to the long-time key updater 24 over a connection 78.

The communication frame acquirer 22 is adapted to perform security processing on the secure communication frame 41 transferred from the receiver 21 to obtain a communication frame. The communication frame acquirer 22 transfers the identification of a key 79 inserted in the secure communication frame 41 to the short-time key acquirer 23, and receives in response a temporary network key 81 from the short-time key acquirer 23. The communication frame acquirer 22 utilizes the temporary network key thus obtained, and performs security processing on the secure communication frame 41 to thereby acquire a communication frame.

In the contest, the security processing may refer to decryption and verification of an authentication code 71, but not limited to those operations. It is to be noted in the illustrative embodiment that algorithm for use in decryption and verification of authentication codes 71 may not be restricted but selected from a wide variety of algorithms.

In order to prevent replay attacks mentioned previously, the communication frame acquirer 22 may be adapted to verify that a count value and time information for use in security processing on secure communication frames 41 are newest and that the address information about a transmission source has not been falsified. For example, the communication frame acquirer 22 may be adapted to manage its counter, not shown, together a temporary network key. The communication frame acquirer 22 compares a key identification used for the security processing on, and inserted in, the secure communication frame 41, the temporary network key thus managed and a count value to each other. Based on the results of the comparison, the communication frame acquirer 22 uses a count value determined new to thereby verify whether or not the address information on a transmission source has been falsified. If the verification is successful, then the managed temporary network key and counter may be updated. In addition, the counter may be set and managed on the basis of each transmission source address.

Alternatively, the communication frame acquirer 22 may not be adapted to manage the counter together with the temporary network key, but to be provided with a count value together with a temporary network key from the short-time key acquirer 23. The communication frame acquirer 22 may be adapted to be responsive to a secure communication frame 41 being successfully authenticated to notify the short-time key acquirer 23 of the counter used for the security processing on the communication frame as the newest counter.

The short-time key acquirer 23 may fundamentally be similar to the short-time key acquirer 14 shown in FIG. 1. More specifically, the key acquirer 23 receives a master network key from the long-time key manager 25 based on a key identification received from the communication frame acquirer 22 on a connection 83. Then, the acquirer 23 uses the received master network key and the identification of a temporary network key contained in the key identification to generate a temporary network key. The short-time key acquirer 23 sends in response the generated temporary network key 81 to the communication frame acquirer 22.

The short-time key acquirer 23 may be adapted to deliver verification information, such as a count value or time information, for preventing replay attacks to the communication frame acquirer 22 together with the temporary network key. The key acquirer 23 may be adapted to receive from the communication frame acquirer 22 a key identification used for the security processing on a secure communication frame 41 successfully authenticated, the newest count value, and the address of a transmission source. The key acquirer 23 compares the newest count value given from the communication frame acquirer 22 with the count value used for the security processing on the secure communication frame 41 by the transmitter communication terminal 10. If both are consistent with each other, then the key acquirer 23 manages the newest count value.

The long-time key updater 24 may fundamentally be identical with the long-time key updater 12 shown in FIG. 1.

The long-time key manager 25 is adapted to manage the master network key 85 received from the long-time key updater 24 in the same way as the long-time key manager 13 shown in FIG. 1.

The operation of the telecommunications system using keys shared across the network between a couple of transmitter communication terminals 10A and 10B, and the receiver communication terminal 20 will be described by referring to FIG. 4 in addition to FIGS. 1, 2 and 3.

Figure 4:
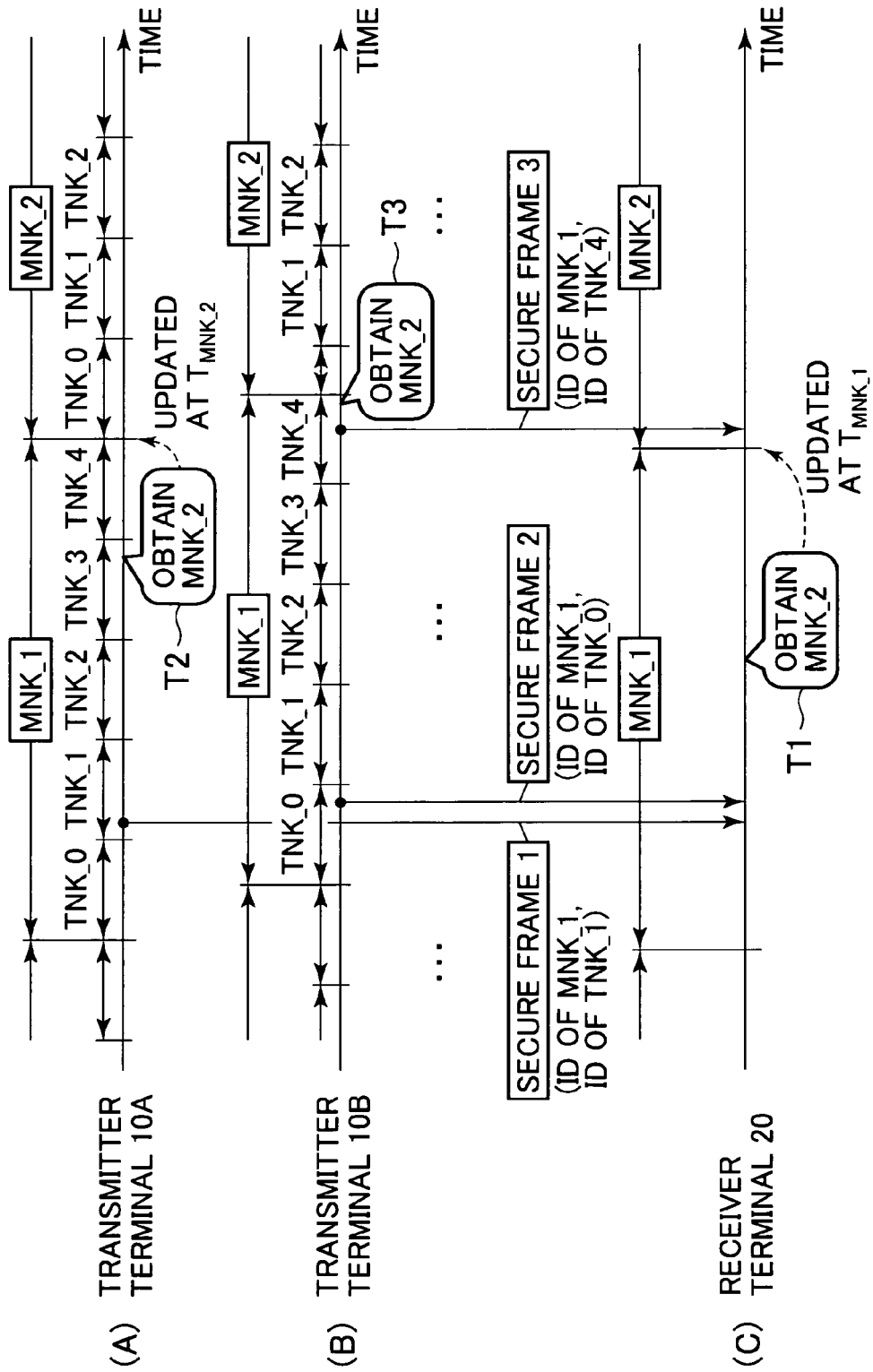
FIG. 4 is a time chart useful for understanding communication processing in a telecommunications system using keys shared across a network according to the embodiment.

FIG. 4 is a timing chart useful for understanding communication processing performed by the telecommunications system using the shared network keys. In the figure, an example is taken in which three secure communication frames 41 are sent and received between the couple of transmitter communication terminals 10A and 10B, and the receiver communication terminal 20. The processing will be described in time sequentially.

FIG. 4, parts (A) and (B), show how the network key is managed in the transmitter communication terminals and 10B, respectively. In the figure, part (C) shows the manner in which the network key is managed in the receiver communication terminal 20.

In FIG. 4, part (A), "MNK_1", "MNK_2" and so forth indicate master network keys, and "TNK_0", "TNK_1" and so forth indicate temporary network keys. The arrows in the time-axis direction indicate periods in which the network keys are used. The same conventions apply to parts (B) and (C).

The secure communication frame 41 will be transmitted and received in the following manner. First, the key ID manager 15 of the one communication terminal 10A periodically updates the identification of a temporary network key.

For example, in FIG. 4, part (A), the long-time key manager 13 of the communication terminal 10A is managing the master network key "$MNK_{13}1$". The key ID manager 15 periodically updates the identification of a temporary network key, so that the temporary network key used by the communication terminal 10A is updated to "TNK_0", "TNK_1", ..., "TNK_4".

When the communication terminal 10A sends a communication frame meant for the communication terminal 20, the key ID manager 15 transfers the key identification information including the identifications of the master network key managed by itself and the newest temporary network key to the communication frame assembler 16.

For example, when the key ID manager 15 transmits the communication frame 1, it transfers key identification information including the identifications of the master network key "MNK_1" and the temporary network key "TNK_1" to the communication frame assembler 16. In the following, the key identification information including, for example, the identifications of the master network key "MNK_1" and the temporary network key "TNK_1" may be represented by key identifications (1-1).

The communication frame assembler 16 transfers the key identification received from the key ID manager 15 to the short-time key acquirer 14.

The short-time key acquirer 14 receives the master network key "MNK_1" indicated by the identification of the master network key "MNK_1" contained in the key identification from the long-time key manager 13. The acquirer 14 then uses the master network key "MNK_1" and the identification of the temporary network key "TNK_1" to thereby generate a temporary network key "TNK_1".

The communication frame assembler 16 receives the temporary network key "TNK_1" generated by the short-time key acquirer 14, and uses the temporary network key "TNK_1" to perform security processing, such as encryption and attachment of an authentication code 71, on the communication frame, thus producing a secure communication frame 1.

The communication frame assembler 16 inserts, as shown in FIG. 3, the key identifications (1-1) used for encryption of the communication frame and attachment of the authentication code 71 into the communication frame 1, as depicted with an arrow 77. As described previously, various methods can be used to perform the security processing on the communication frame. In addition, data 69 and an authentication code 71 located behind the data 69 in the frame format may be encrypted.

The secure communication frame 1 thus produced by the communication frame assembler 16 is sent toward the communication terminal 20 via the transmitter 17.

When the receiver communication terminal 20 receives the communication frame from the transmitter communication terminal 10, the communication frame acquirer 22 performs security processing, such as decryption and authentication, on the secure communication frame 41 received via the receiver 21 to obtain the communication frame 1.

The communication frame acquirer 22 first transfers the identification of the key inserted in the received secure communication frame 1 to the short-time key acquirer 23.

The short-time key acquirer 23 uses the master network key "MNK_1" indicated by the key identification included in the master network key delivered from the long-time key manager 25 and the identification of the temporary network key "TNK_1", and produces the temporary network key "TNK_1" to deliver the temporary network key "TNK_1" to the communication frame acquirer 22.

The communication frame acquirer 22 uses the temporary network key "TNK_1" delivered from the short-time key acquirer 23, and performs security processing, such as decryption and authentication, on the secure communication frame 1 to acquire the communication frame 1.

The secure communication frame 2 will be transmitted and received in the following fashion. When a communication frame 2 is transmitted from the other transmitter communication terminal 10B to the receiver communication terminal 20, the operation similar to the aforementioned sending and reception from the transmitter communication terminal 10A to the receiver communication terminal 20 will be performed.

Specifically, the key ID manager 15 of the transmitter communication terminal 10B transfers the key identification information including the identifications of the master network key "MNK_1" and the temporary network key "TNK_0" to the communication frame assembler 16. In the following description, key identification information including, for example, the identifications of the master network key "MNK_1" and the temporary network key "TNK_0" may be represented by key identifications (1-0).

The communication frame assembler 16 transfers the key identifications (1-0) obtained from the key ID manager 15 to the short-time key acquirer 14.

The short-time key acquirer 14 obtains the master network key "MNK_1" indicated by the identification of the master network key "MNK_1" contained in the key identifications (1-0) from the long-time key manager 13, and uses the identification of the master network key "MNK_1" and the temporary network key "TNK_0" to generate the temporary network key "TNK_0".

The communication frame assembler 16 obtains the temporary network key "TNK_0" generated by the short-time key acquirer 14, and uses the temporary network key "TNK_0" to perform security processing, such as encryption and attachment of an authentication code 71, on the communication frame to thereby produce a secure communication frame 2.

At this time, the communication frame assembler 16 inserts, as shown in FIG. 3, into the communication frame 1 the key identifications (1-0) used for the encryption of the communication frame and attachment of the authentication code 71. As previously described, various methods can be applied to the security processing on the communication frame. In addition, data 69 and the authentication code 71 located behind the data 69 may also be encrypted.

The communication frame 1 produced by the communication frame assembler 16 is sent toward the receiver communication terminal 20 via the transmitter 17.

When the communication terminal 20 receives the secure communication frame 41 from the communication terminal 10B, the communication frame acquirer 22 performs security processing, such as decryption and authentication, on the secure communication frame 41 received via the receiver 21 and obtains, or restores, the communication frame 2.

The communication frame acquirer 22 transfers the key identification inserted in the obtained secure communication frame 2 to the short-time key acquirer 23.

The short-time key acquirer 23 uses the master network key "MNK_1" indicated by the key identification contained in the master network key given from the long-time key manager 25 and the identification of the temporary network key "TNK_0" to generate a temporary network key "TNK_0", and transfers the temporary network key "TNK_0" to the communication frame acquirer 22.

The communication frame acquirer 22 obtains the temporary network key "TNK_1" from the short-time key acquirer 23. The frame acquirer 22 in turn uses the temporary network key "TNK_0" to perform security processing, such as decryption and authentication, on the communication frame to thereby derive the communication frame 2.

The master network key will be updated in the following fashion. In FIG. 4, part (C), the communication terminal 20 receives a notification message about a new master network key "MNK_2" at timing of instant T1.

At a given instant TMNK_2 at which the use is started, the long-time key updater 24 of the communication terminal 20 transfers the new master network key "MNK_2" contained in the received notification message to the long-time key manager 25, and starts to use the master network key "MNK_2". The instant TMNK_2 at which the use is started may be contained in the notification message stated above or a separate notification message to be transmitted for the same purpose.

In FIG. 4, part (A), the one transmitter communication terminal 10A receives a notification message about the new master network key "MNK_2" at timing of instant T2. The long-time key updater 12 transfers the master network key "MNK_2" to the long-time key manager 13 at the instant TMNK_2 at which the use is started, and starts to use the master network key "MNK_2", in the same way as in the operation of the receiver communication terminal 20.

It will be described how a secure communication frame 3 is transmitted and received. When the other transmitter communication terminal 10B sends a communication frame 3 to the communication terminal 20, the key ID manager 15 of the transmitter communication terminal 10B delivers key identification information including both the identifications of the master network key "MNK_1" and the temporary network key "TNK_4" to the communication frame assembler 16. In the following description, the key identification including, for example, both the identifications of the master network key "MNK_1" and the temporary network key "TNK_4" may be indicated by key identifications (1-4).

The communication frame assembler 16 transfers the key identifications (1-4) obtained from the key ID manager 15 to the short-time key acquirer 14.

The short-time key acquirer 14 obtains the master network key "MNK_1" indicated by the identification of the master network key "MNK_1" contained in the key identifications (1-4) from the long-time key manager 13, and uses the master network key "MNK_1" and the identification of the temporary network key "TNK_4" to produce a temporary network key "TNK_4".

The communication frame assembler 16 receives the temporary network key "TNK_4" produced by the short-time key acquirer 14, and uses the temporary network key "TNK_4" to perform security processing, such as encryption and attachment of an authentication code 71, on the communication frame, thus producing a secure communication frame 3.

At this time, the communication frame assembler 16 inserts, as shown in FIG. 3, into the communication frame 1 the key identifications (1-4) used for encryption of the communication frame and attachment of the authentication code 71. As described previously, various methods can be used to perform the security processing on the communication frame. In addition, data 69 and the authentication code 71 located behind the data 69 may also be encrypted.

The secure communication frame 3 in which the key identifications (1-4) are inserted is sent to the receiver communication terminal 20 via the transmitter 17 in the same way as in the case of sending the secure communication frames 1 and 2 produced by the communication frame assembler 16.

When the instant TMNK_2 passes, the secure communication frame 3 is sent out from the transmitter communication terminal 10B. The terminal 10B has not received a notification message about the new master network key "MNK_2", and therefore the master network key "MNK_1" is used to produce the secure communication frame 3.

Thus, the identifications (1-4) of the key managed by the key identification manager 15 of the transmitter communication terminal 10B are inserted in the secure communication frame 3.

The communication terminal 20 obtains the secure communication frame 3 by means of its receiver 21. The receiver transfers the secure communication frame 3 to the communication frame acquirer 22.

The communication frame acquirer 22 delivers the key identifications (1-4) inserted in the obtained secure communication frame 3 to the short-time key acquirer 23.

The short-time key acquirer 23 in turn receives the master network key "MNK_1" from the long-time key manager 25, and uses the master network key "MNK_1" and the identification of the temporary network key "TNK_4" contained in the key identification to produce a temporary network key "TNK_4". The acquirer 23 then provides the temporary network key "TNK_4" to the communication frame acquirer 22.

The communication frame acquirer 22 can use the temporary network key "TNK_4" from the short-time key acquirer 23 to perform security processing, such as decryption and authentication, on the communication frame to thereby obtain the communication frame 3.

After sending the communication frame 3, the long-time key updater 12 of the transmitter communication terminal 10B receives the notification message about the new master network key "MNK_2" and obtains the new master network key "MNK_2".

In response to the instant TMNK_2 at which the use is started having already passed, the long-time key updater 24 starts to use the master network key "MNK_2".

After the instant "TMNK_2" at which the use is started, the key identification manager 15 of the transmitter communication terminal 10B may adjust the state of management of the identification of the used temporary network key according to the elapsing period of time. For example, where the key identification manager 15 is adapted to periodically update the identification of a temporary network key, it may continue to manage, since the instant "TMNK_2" at which the use is started, the identification of the temporary network key which would normally be applied from the current time.

In summary, the telecommunications system of the illustrative embodiment utilizing a temporary network key to establish secure communications is specifically featured by employing at least the identification of a master network key and inserting the identification of a temporary network key into a secure communication frame to thereby produce a temporary network key.

For example, when a network key is frequently updated on a large-scale network formed by a large number of nodes, there would be the anxiety that, as new network keys are distributed, traffic increases and it takes a long time to synchronize the nodes with each other with respect to the network keys. Such a long time is taken to synchronize the nodes with each other with respect to network keys because delivery of the keys may involve delays and communication path faults, and because some communication terminals have the sleep mode thereof in operation, i.e. for power-saving mode of operation in which the communication terminals stop sending and receiving data when they have no data to transmit.

In the illustrative embodiment, the security of communication data is assured by utilizing at least a master network key and a temporary network key generated from a key identification. The key identification used for the generating a temporary network key is inserted in a communication frame. Consequently, it is not necessary to distribute a new network key to every communication terminal each time frequently updating network keys.

A communication terminal on the receiver side can obtain on demand a key identification to be inserted in a received secure communication frame. That means that the communication terminal is required neither be synchronous with other communication terminals with respect to a temporary network key nor grasp a temporary network key all the time.

Therefore, a telecommunications system using keys shared across a network capable of sending and receiving secure communication frames can be offered in which the timing when a temporary or a master network key is updated fluctuates. Furthermore, when a long-time master network key is periodically updated by, for example, distributing the key, the key may be delivered later on in background while frequently switching the temporary network key.

An alternative embodiment of the telecommunications system of the present invention will be described with reference to FIG. 5. The alternative embodiment may be similar to the illustrative embodiment shown in and described with reference to FIGS. 1-4 except for having the feature of being synchronized with respect to the identification of the newest key.

Figure 5:
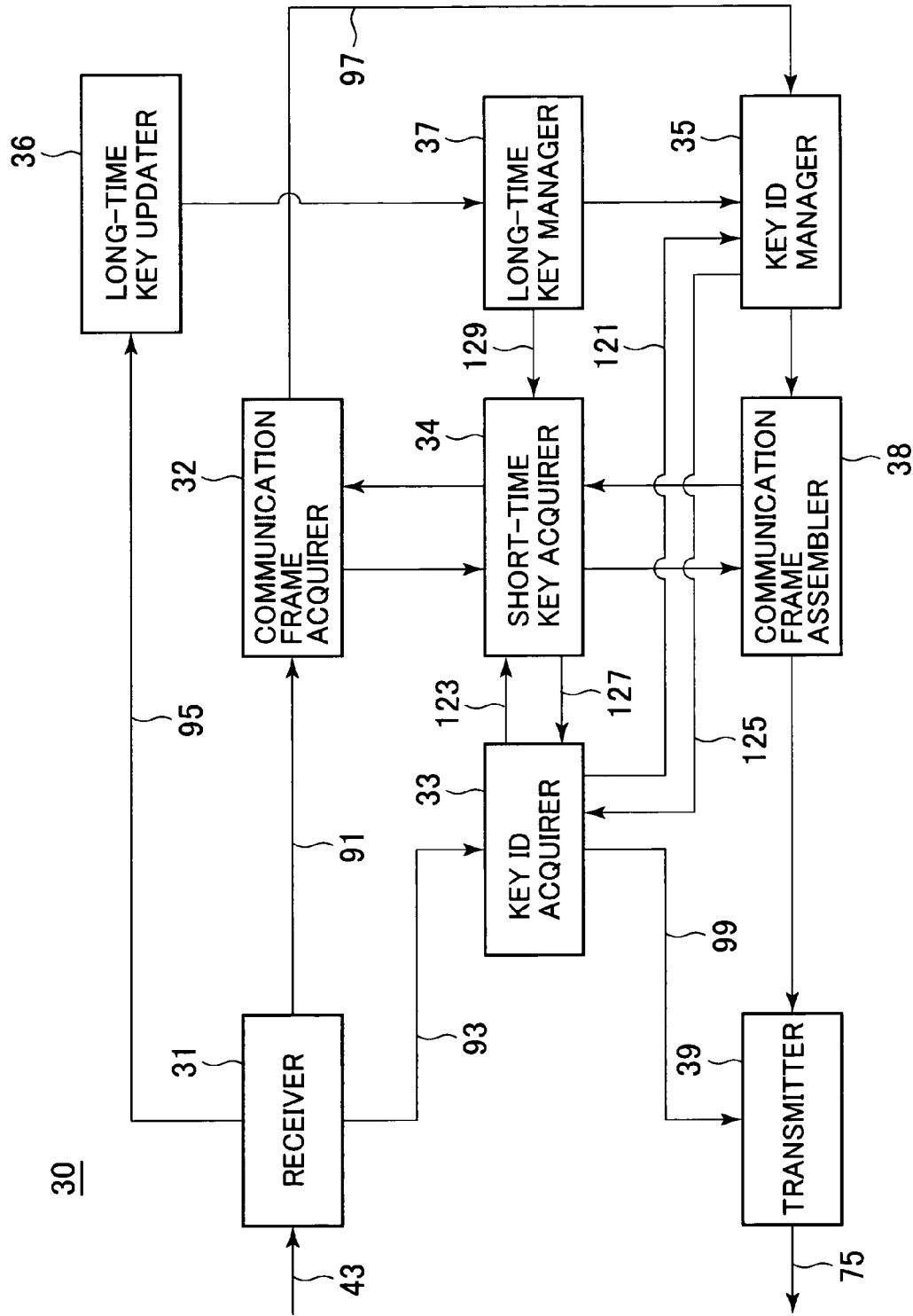
FIG. 5 is a schematic block diagram, like FIGS. 1 and 2, showing the internal structure of a communication terminal according to an alternative embodiment of the invention.

FIG. 5 shows the internal configuration of the communication terminal 30 of the alternative embodiment. Generally, the communication terminal 30 includes at least a receiver 31, a communication frame acquirer 32, a key ID acquirer 33, a short-time key acquirer 34, a key ID manager 35, along-time key updater 36, a long-time key manager 37, a communication frame assembler 38 and a transmitter 39, which are interconnected as shown.

The receiver 31 is adapted to receive a secure communication frame 41 supplied from another communication terminal over the line 43, and deliver it to the communication frame acquirer 32 on an interconnection 91. The receiver 31 is also adapted to transfer a key identification request message 101, FIG. 6A, or a key identification reply message 103, FIG. 6B, supplied from the other communication terminal to the key ID acquirer 33 on an interconnection 93. The receiver 31 may be adapted to feed the long-time key updater 36 with a secure communication frame 41 on a connection 95 when the frame 14 carries a notice message of a master network key shared across the network and used over a long term.

The communication frame acquirer 32 may fundamentally be similar in operation to the communication frame acquirer 22 of the receiver communication terminal 20 shown in FIG. 2, but is further adapted to perform the following operations.

The communication frame acquirer 32 performs security processing, including decryption and authentication, on the secure communication frame 41 delivered from the receiver 31 and obtains a communication frame. Then, the acquirer 32 provides the key identification inserted in the derived communication frame to the key ID manager 35 on a connection 97.

The key ID acquirer 33 obtains a key identification received from another communication terminal by the receiver 31. When a request for a key identification from another communication terminal is received by the receiver 31, the acquirer 33 provides a key identification 99 employed by the acquirer 33 itself to the transmitter 39, which will in turn send the information to the other communication terminal.

For example, the key identification leads to producing a key identification request message 101 including challenge information, which is information about random numbers temporarily generated, the information being transferred to the communication frame assembler 38. A key identification reply message 103 responsive to the challenge information is given from the receiver 31. Thus, the key identification contained in the key identification reply message 103 is delivered to the short-time key acquirer 34, which in turn provides a temporary network key identified with the key identification. Consequently, the key identification reply message 103 thus provided is decrypted and/or authenticated. If it is confirmed that the challenge information added to the key identification request message 101 by the acquirer 33 itself is correctly reflected in the key identification reply message 103 that has been successfully decrypted and/or authenticated, then it is verified that the key identification reply message 103 is an authentic message.

The decision made as to whether the information is correctly reflected depends on whether or not the challenge information is contained in the key identification reply message 103, or on whether or not the key identification reply message 103 has been encrypted and/or an authentication code 71 has been generated by utilizing the challenge information.

Now, with reference to FIGS. 6A and 6B, examples of key identification request message 101 and key identification reply message 103 will be described. As shown in FIG. 6A, the key identification request message 101 has a header field 105 holding address information. In addition, the message 101 has a challenge information field 105 including, for example, random numbers. As shown in FIG. 6B, the key identification reply message 103 is configured including at least the fields of a header 109 holding address information, key identifications 111 and 113, a count value 115, challenge information 117 including, for example, random numbers, and an authentication code 119. The challenge information 117 and authentication code 119 may be encryptable.

Returning now to FIG. 5, the key ID acquirer 33 is adapted to determine, if the key identification reply message 103 delivered from the receiver 31 has been duly authenticated, that the key identification contained in the key identification reply message 103 indicates the newest key identification number currently used by another communication terminal. The key ID acquirer 33 transfers the key identification 121 to the key ID manager 35. At the same time, the acquirer 33 may supply a key identification, the address of a transmission source and a count value contained in the key identification reply message 103 to the short-time key acquirer 34, as symbolically depicted with a connection 123. In the alternative embodiment, the aforementioned key identification request message 101 may be produced in order to recover the identification of the newest key, for example, when the terminal 30 has been awaked from its sleep mode or when the key identification has been lost upon rebooting. However, the invention may not be limited to this assumption.

When a key identification request message 101 is received from other communication terminal by the receiver 31, the ID acquirer 33 asks the key ID manager 35 for a key identification and obtains the identification of the newest key on a connection 125. The acquirer 33 transfers the key identification derived from the key ID manager 35 to the short-time key acquirer 34. The acquirer 34 sends back a temporary network key to the key ID acquirer 33 on a connection 127, and thus the ID acquirer 33 makes use of the temporary network key and the challenge information contained in the key identification request message 101 to generate a key identification reply message 103 by.

In the alternative embodiment, the key identification reply message 103 has been secured by utilizing the temporary network key and the challenge information. In the context, the security processing may mean encryption and/or attachment of an authentication code 119, for example, as symbolically depicted with an arrow 120 in FIG. 6B. In the process of securing the message by utilizing the challenge information, the challenge information may be included in the key identification reply message 103. Alternatively, the challenge information may be used in performing an encryption and/or generating an authentication code 119. In the instant embodiment, the identification of a temporary network key utilized for security processing may be inserted in the key identification reply message 103. The key identification reply message 103 may be subjected to a security conversion by utilizing, for example, information used to prevent replay attacks, such as a count value, time information and information on its own address. Such a count value and time information may be obtained together with a temporary network key from the short-time key acquirer 34. The key identification acquirer 33 transfers the key identification reply message 103 thus produced to the communication frame assembler 38.

The short-time key acquirer 34 may operate similarly to the short-time key acquirers 14 and 23 of the transmitter and receiver communication terminals 10 and 20 shown in FIGS. 1 and 2, respectively, when cooperatively operating with each other, except for additional operations, which will be described below.

The short-time key acquirer 34 is supplied with a key identification 123 from the key ID acquirer 33 and receives a master network key 129 from the long-time key manager 37. The short-time key acquirer 34 uses the master network key and the temporary network key identification, and produces a temporary network key to send back the produced key to the key ID acquirer 33. The acquirer 34 are fed from the key ID acquirer 33 with the key identifications 111 and 113, the address of a transmission source 109, and a count value 115 used for preventing replay attacks contained in the key identification reply message 103 authenticated. The acquirer 34 may perform management with the supplied count value decided as the newest one which the communication terminal having the address of the transmission source used for security processing for the communication frame.

The operation of the key ID manager 35 may be similar to the operation of the key ID manager 15 of the transmitter communication terminal 10 shown in FIG. 1 except that the following operation is also performed.

The key ID manager 35 receives the identification of a first key inserted in the secure communication frame 41 successfully authenticated from the communication frame acquirer 32, and compares the supplied information with the identification of a second key the manager 35 manages. If the identification of the first key is determined to be newer than the identification of the second key, then the key ID manager 35 decides that the identification of the first key is the newest key identification currently used on the network, and updates the identification of the second key or proceeds to management with the identification of the first key taken as the newest information.

The newest information may be determined in such a fashion that, for example, if a count value is adapted for representing a serial number as a key identification, the identification may be determined as new when the count value increments or decrements. If a bit sequence is adapted to be allotted to each network key as a key identification, for example, the identification may be determined as new when it was not received in the past.

The key ID manager 35, when asked for a key identification from the key ID acquirer 33, sends back the identification of the newest key presently managed. The key ID manager 35 may respond after having updated the key identification to the newer key identification. The manager 35, when provided with the identification of a third key contained in the successfully authenticated key identification reply message 103 from the key ID acquirer 33, compares the supplied information with the identification of the second key the manager 35 manages. If the identification of the third key is determined to be newer than the identification of the second key, then the manager 35 decides the identification of the third key to be the identification of the newest key currently used on the network, and updates the identification of the second key or proceeds to management with the identification of the third key taken as the newest information.

If the identification of the second key is no longer managed at the instant when the identification of the third key is given, e.g. when the key ID manager 35 has lost the identification of the second key, then the identification of the third key may be managed without making a comparison to see if the information is newer. Alternatively, the key ID manager 35 may update the identification of the third key to a newer identification for management. When the identification of the third key is the same as the identification of the second key, the manager 35 may also update the identification of the third key to a newer identification for management.

The long-time key updater 36 may fundamentally be identical in operation with the long-time key updater 12 of the transmitter communication terminal 10 shown in FIG. 1.

Also, the long-time key manager 37 may fundamentally be identical in operation with the long-time key updater 13 of the transmitter communication terminal 10 shown in FIG. 1.

Further, the communication frame assembler 38 may fundamentally be identical in operation with the communication frame assembler 16 of the transmitter communication terminal 10 shown in FIG. 1.

The transmitter 39 sends out to another communication terminal the secure communication frame 41 provided from the communication frame assembler 38 and the key identification request message 101 provided from the key ID acquirer 33 or a key identification reply message 103. The key identification request message 101 may be broadcast to adjacent communication terminals.

The operation of the telecommunications system according to the alternative embodiment will be described by referring to FIG. 7, the system using keys shared across the network.

In this example, a communication terminal 30C asks other communication terminals, e.g. 30A and 30B, for the identification of a key which is used on the network but has been lost when rendered to its sleep mode, in order to recover the newest identification of the key used on the network. Furthermore, the other communication terminals 30A and 30B synchronize with each other in terms of the network keys while grasping the newest key identification. The operation will be described in time sequential.

In FIG. 7, part (A), the long-time key updater 36 of the one communication terminal 30A receives a notice message of a new master network key and obtains the new master network key MNK_2 (T101). In the one terminal 30A, the long-time key updater 36 transfers the master network key MNK_2 to the long-time key manager 37.

In FIG. 7, part (B), the long-time key updater 36 of the other communication terminal 30B obtains the new master network key MNK_2 in the same manner as the communication terminal 30A (T103) and transfers the key MNK_2 to the long-time key manager 37.

In FIG. 7, part (C), the key identification acquirer 33 of the communication terminal 30C produces a key identification request message (MSG) 101 and the transmitter 39 broadcasts the request message 101 (T105).

The key identification request message 101 sent from the communication terminal 30C is delivered to the key ID acquirers 33 of the communication terminals 30A and 30B through the receiver 31.

Upon receiving the key identification request message 101, the key ID acquirer 33 of the communication terminal 30A asks the key ID manager 35 for the identification of keys. Then, a key identification including the identification of the network key "MNK_1" and the identification of a temporary network key "TNK_3" are transferred to the key ID acquirer 33 from the key ID manager 35. In the following description, key identification information including the identifications of the master network key "MNK_1" and the temporary network key "TNK_3" may be represented by key identifications (1-3).

The key ID acquirer 33 sends the key identifications (1-3) derived from the key ID manager 35 to the short-time key acquirer 34 and obtains the temporary network key "TNK_3". The key ID acquirer 33 uses the acquired temporary network key "TNK_3" and the challenge information contained in the received key identification request message 101, and produces a key identification reply message 1 to send back the produced reply message 1 to the communication terminal 30C via the transmitter 39 (T106). For producing the key identification reply message 1, information for preventing replay attacks, such as a count value, time information, and information on its own address, may be utilized.

The key ID acquirer 33 of the communication terminal 30C is provided with the key identification reply message 1 from the receiver 31. The acquirer 33 transfers the key identifications (1-3) inserted in the reply message 1 to the short-time key acquirer 34, and acquires the temporary network key "TNK_3" from the short-time key acquirer 34.

The key ID acquirer 33 uses the temporary network key "TNK_3" and the challenge information which the acquirer 33 per se has transmitted to verify whether or not the key identification reply message 1 given from the receiver 31 has been authentically produced. If the verification indicates that the message is authentic, then the key identifications (1-3) are transferred to the key ID manager 35. The count value and address information on the transmission source which has been used to produce the key identification reply message 1 authenticated may be delivered to the short-time key acquirer 34 along with the key identifications (1-3).

The key ID manager 35 is supplied with the key identifications (1-3) from the key ID acquirer 33. The manager 35 determines that the key identifications (1-3) is the newest key identification currently used on the network, and sets and manages key identifications (1-4) (T107).

The key identification acquirer 33 of the other communication terminal 30B performs processing similar to the processing performed by the one communication terminal 30A. Upon receiving a key identification request message 101, the key ID acquirer 33 asks the key ID manager 35 for a key identification. The acquirer 33 is provided with a key identification including the identifications of the network key "MNK_1" and the temporary network key "TNK_4" from the key ID manager 35. In the following description, key identification information including, for example, the identifications of the master network key "MNK_1" and the temporary network key "TNK_4" may be represented by key identifications (1-4).

The key ID acquirer 33 transfers the key identifications (1-4) obtained from the key ID manager 35 to the short-time key acquirer 34, and obtains the temporary network key "TNK_4". The acquirer 33 utilizes the obtained temporary network key "TNK_4" and the challenge information contained in the received key information request message 101, and produces the key identification reply message 103 2. The transmitter 39 sends back the produced reply message 103 2 to the communication terminal 30C (T108). For producing the key identification reply message 103 2, information for preventing replay attacks, such as a count value, time information, and information on its own address, may be utilized.

The key ID acquirer 33 of the communication terminal 30C authenticates the key identifications (1-4) about the key identification reply message 103 2 received from the communication terminal 30B as duly in the same way as in the sequence T107. The key ID manager 35 is supplied with the key identifications (1-4) from the key identification acquirer 33 and compares the supplied information with the key identifications (1-4) managed by the manager 35 itself. The manager 35 updates the key identifications (1-4) to newer key identifications (1-5) for management (T109).

In the communication frame assembler 38 of the communication terminal 30C, a communication frame 1 destined for the communication terminal 30A is assembled. As described regarding the operation of the illustrative embodiment shown in FIGS. 1-4, the frame assembler 38 assembles and sends out a secure communication frame 1 (T110). The key identifications (1-4) are inserted into the secure communication frame 1.

The communication frame acquirer 32 of the communication terminal 30A performs security processing, including decryption and authentication, on the secure communication frame 1, and obtains the communication frame 1, as described regarding the operation of the illustrative embodiment shown in FIGS. 1-4. The key ID manager 35 is supplied with the key identifications (1-4) inserted in the secure communication frame 1, and compares them with the key identifications (1-3) managed by the manager 35 itself. The manager 35 responds to the key identifications (1-4) obtained from the communication frame acquirer 32 being newer than the key identifications (1-3) the manager 35 manages by itself, and updates the key identification managed by the manager to identifications (1-4) (T111).

The long-time key updater 36 of the communication terminal 30C receives a notice message of a new master network key, and obtains the new master network key "MNK_2" (T112). The updater 36 transfers the master network key "MNK_2" to the long-time key manager 37.

In the communication frame assembler 38 of the communication terminal 30A, a broadcast communication frame 2 is assembled. As described regarding the operation of the illustrative embodiment shown in FIGS. 1-4, the assembler 38 assembles and sends out a secure communication frame 2 (T114).

The key ID manager 35 is responsive to the identification of the temporary network key "TNK_4" being predominant to determine that the serial number of the temporary network key is soon going to expire. The manager 35 updates the identification of the master network key to the identification of the master network key "MNK_2" (T102). At the same time, the manager 35 initializes the identification of the temporary network key and takes it as the identification of the temporary network key "TNK_0". Thus, the key identifications (2-0) are inserted into the secure communication frame 2 to be sent out by the communication terminal 30A.

The communication frame acquirer 32 of the other communication terminal 30B performs security processing, such as decryption and authentication, on the secure communication frame 2 and obtains the communication frame 2, as described regarding the operation of the illustrative embodiment shown in FIGS. 1-4. The key ID manager 35 is fed with the key identifications (2-0) inserted in the secure communication frame 2, and compares them with the key identifications (1-4) the manager 35 manages by itself. The manager 35 is in response to the key identifications (2-0) obtained from the communication frame acquirer 32 being newer than the key identifications (1-4) managed by itself to update the key identification managed by itself to identifications (2-0) (T104).

The communication terminal 30C obtains the communication frame 2 in the same way as the communication terminal 30B. The key ID manager 35 updates the key identification which the manager 35 manages by itself to identifications (2-0) (T113).

In short, the alternative embodiment yields the following advantages in addition to the advantages of the illustrative embodiment. When each communication terminal can correctly obtain a communication frame subjected to security processing with a temporary network key identified with the key identification determined to be newer than the key identification managed by the terminal itself, the key identification thus determined to be newer is managed as the newest key identification currently used on the network, that is, the key identification is updated to the key identification thus determined.

If a communication terminal which lost the newest key identification when rendered to its sleep mode or rebooted asks another communication terminal for a key identification and receives a currently used key identification sent back from the other terminal, the subject terminal updates the key identification it managed by itself to the newest key identification.

As described so far, a telecommunications system can be offered which is based on the illustrative embodiment shown in FIGS. 1-4 and further featured by sharing keys across a flexible, secure telecommunications network in such a way that the nodes of the network can be synchronized with each other in respect of the newest temporary network key while permitting the whole network to be generally asynchronous in terms of the temporary network key.

In the description above, various modifications have been mentioned. Further modified embodiments can be cited as exemplified below.

The illustrative embodiments are directed to a large-scale mesh network. The present invention may not be limited to such specific network in respect of scale or network topology. The invention may also be applied to a small-scale network or to a tree network topology.

In the illustrative embodiments, a master network key and a temporary network key are defined as common keys shared across the whole network. The range in which the keys are shared may not restrictively be applied to the whole network. For example, these keys may be shared only by some of the communication terminals in the network.

In the illustrative embodiments, a communication frame is obtained by deriving a temporary network key from a key identification inserted in a secure communication frame, and utilizing the temporary network key to authenticate the secure communication frame. However, the system may be adapted to determine the obtained communication frame as not new when the key identification inserted in a secure communication frame provides a value lower than a predetermined threshold value or is older than the key identification the key ID manager manages.

The entire disclosure of Japanese patent application No. 2010-20401 filed on Feb. 1, 2010, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What we claim is:

1. A communication terminal comprising:
a long-time key manager for managing a master network key;
a key identification manager for managing a key identification of keys;
a short-time key acquirer for using the master network key and the key identification to generate a temporary network key;
a communication frame assembler for using the temporary network key to perform security processing to thereby assemble a secure communication frame, and inserting the key identification in plaintext in the assembled secure communication frame;
a transmitter for sending the secure communication frame to another communication terminal;
a receiver for receiving another secure communication frame from the another communication terminal over a mesh type telecommunications network;
a key identification acquirer for obtaining another key identification included in the received secure communication frame in plaintext; and
a communication frame acquirer for using the temporary network key to perform security processing on the received secure communication frame to obtain a communication frame, wherein
when the another key identification inserted in the received secure communication frame is newer than the key identification managed by said key identification manager, said key identification manager manages the another key identification of the received communication frame as a newest key identification,
the another key identification includes information indicating a serial number of the master network key and information on a count value indicating a serial number of the temporary network key,
said key identification manager makes a decision as to whether or not the managed key identification is the newest according to a magnitude indicated by the information on the count value indicating the serial number of the temporary network key, as long as the information indicating the serial number of the master network key remains the same, and
said communication frame assembler receives the count value, and time information and address information of said another communication terminal together with the temporary network key for preventing a reply attack.

2. The communication terminal in accordance with claim 1, further comprising a long-time key updater for replacing the master network key managed by said long-time key manager with another master network key received over the mesh type telecommunications network.

3. The communication terminal of claim 2, wherein the long-time key updater updates the master network key to use a new master network key at a timing specified by information received along with the new master network key.

4. The communication terminal of claim 2, wherein the long-time key updater updates the master network key to use a new master network key at a timing specified by a separate message that identifies the timing.

5. The communication terminal of claim 2, wherein the long-time key updater updates the master network key to use a new master network key at a timing according to an expiration of a counter.

6. The communication terminal in accordance with claim 1, wherein the key identification managed by said key identification manager is updated at arbitrary timing.

7. The communication terminal in accordance with claim 1, further comprising a key identification acquirer for asking the another communication terminal for the another key identification managed by the another communication terminal, or for sending back the key identification managed by said key identification manager of the subject terminal in response to a request from the another communication terminal, said key identification manager using the another key identification obtained by said key identification acquirer to manage or update the key identification of its own.

8. The communication terminal in accordance with claim 7, wherein said key identification manager manages or updates a key identification determined to be newer than the key identification obtained by said key identification acquirer as its own key identification.

9. A secure communication system for encrypting and authenticating a communication frame by utilizing a key shared across a mesh type telecommunications network, said secure communication system comprising a plurality of communication terminals, each of said plurality of communication terminals comprising:

a long-time key manager for managing a master network key;

a key identification manager for managing a key identification of keys;

a short-time key acquirer for using the master network key and the key identification to generate a temporary network key;

a communication frame assembler for using the temporary network key to perform security processing to thereby assemble a secure communication frame, and inserting the key identification in plaintext in the assembled secure communication frame;

a transmitter for sending the secure communication frame to another communication terminal;

a receiver for receiving another secure communication frame from the another communication terminal over a mesh type telecommunications network;

a key identification acquirer for obtaining another key identification included in the received secure communication frame in plaintext; and a communication frame acquirer for using the temporary network key to perform security processing on the received secure communication frame to obtain a communication frame, wherein when the another key identification inserted in the received secure communication frame is newer than the key identification managed by said key identification manager, said key identification manager manages the another key identification of the received communication frame as a newest key identification, the key identification managed by the key identification manager includes information indicating a serial number of the master network key and information on a count value indicating a serial number of the temporary network key, said key identification manager makes a decision as to whether or not the managed key identification is the newest according to a magnitude indicated by the information on the count value indicating the serial number of the temporary network key, as long as the information indicating the serial number of the master network key remains the same, and said communication frame assembler receives the count value, and time information and address information of said another communication terminal together with the temporary network key for preventing a reply attack.

* * * * *